June 19, 1962 U. F. GIANOLA 3,040,305

MAGNETIC MEMORY CIRCUITS

Filed Nov. 2, 1959 2 Sheets-Sheet 1

INVENTOR
U. F. GIANOLA
BY William H. Kamstra
ATTORNEY

June 19, 1962 U. F. GIANOLA 3,040,305

MAGNETIC MEMORY CIRCUITS

Filed Nov. 2, 1959 2 Sheets-Sheet 2

INVENTOR
U. F. GIANOLA
BY William H. Kamstra
ATTORNEY

United States Patent Office 3,040,305

Patented June 19, 1962

3,040,305
MAGNETIC MEMORY CIRCUITS

Umberto F. Gianola, Florham Park, N.J., assignor to Bell Telephone Laboratories, Incorporated, New York, N.Y., a corporation of New York Filed Nov. 2, 1959, Ser. No. 850,145
15 Claims. (Cl. 340—174)

This invention relates to information handling circuits and more particularly to such circuits in which information is stored in an array of magnetic memory elements.

Magnetic memory elements, such as toroidal magnetic cores and multi-apertured magnetic structures in which information values may be permanently stored, are well known in the information handling art. Such storage is made possible by the exploitation of the square loop hysteresis characteristics of certain magnetic materials such as, for example, ferrites, the information values being stored in the form of representative remanet magnetizations of the elements. A single element may thus be made to contain, for example, an information bit in the binary notation. When a plurality of such memory elements are associated together in a coordinate array, each row of memory elements may be made to contain a binary "word" with the elements of the columns containing the corresponding information bits making up the word rows.

In known word-organized coordinate array storage arrangements access to particular word rows and the specific memory elements of a word row, generally is had by means of the coincident application of partial magnetomotive drives. A row energizing conductor inductively coupled to each memory element of a row containing the desired information address is energized coincidentally with a column energizing conductor inductively coupled to each memory element of the column also containing the desired information address. The drive currents applied to the coordinate energizing conductors thus defining a particular information address are adjusted so that neither alone is of sufficient magnitude to cause a significant change in the magnetic state of the selected memory element. The total magnetomotive force generated by the combined coordinate drive current at the selected element however is determined to be sufficient to cause a complete flux switching or excursion from one remanent point on its hysteresis loop to the other. Such a switching obviously will occur only if the memory element is not already at the remanent point on the hysteresis loop in which the coincident drive currents are operative.

The coincident drive technique is utilized for the write-in operation in introducing into the rows the binary "1's" and "0's" making up the binary words. Interrogation or read-out of an entire word is accomplished by applying a read-out current to a row read-out conductor also inductively coupled to each of the elements of a selected row. In this case, the read-out current is of sufficient magnitude such that where the polarity of the remanent flux of a memory element permits, a complete flux switching can also take place. The flux switchings thus brought about are then manifested as output currents induced in output conductors inductively coupled to the memory elements of each column. The character of the information bits comprising an interrogated word are thus made simultaneously available in the presence or absence of induced output signals on the column output conductors. The applied interrogation drive is also effective to clear a word row of its stored information after a read-out phase of operation. A magnetic memory array such as is generally described in the foregoing is thus prepared for the reintroduction of the information read out or for the introduction of new and different information.

In the foregoing consideration of the coincident drive write phase of operation, it is noted that a minimum value is set for each of the drive currents to insure that their coincidence will cause a complete flux switching in a selected memory element where possible. However, it is also to be noted that in order to insure an adequate degree of discrimination in selecting between information addresses, an upper limit must also be carefully observed for each of the partial drive currents producing the total write drive. The importance of such an upper limitation becomes clear from the fact that, during a write operation, in addition to the combined drives being applied to a selected memory element, partial drives are simultaneously being applied to the nonselected elements occurring in the row and column defining the selected element. The latter partial drives must obviously be maintained below the level at which a complete flux switching can be caused to avoid disturbing the information representative magnetic states of the nonselected memory elements. The necessity of strict adherence to critical drive current values may thus present an important limitation on the flexibility and application of many known magnetic memory arrays.

In most information handling systems increase in speed of access to particular information addresses of component memories has been a continuing goal. Among the factors governing the access speeds attainable is the flux switching time of the magnetic memory elements comprising the memory array. In this connection, the necessity of maintaining an upper limit on the coincident partial drive currents in conventional memory arrays precludes the achievement of higher switching speeds by the expedient of substantially increasing the drive currents. Accordingly, any magnetic memory device selectively accessible by the coincident application of drive currents, which currents have no upper limit of magnitude would represent an important advance in the magnetic memory art.

In magnetic memory arrays employing multi-apertured memory structures, an additional consideration effecting flux switching speeds is the generally longer flux paths traversed by the switching flux. From the viewpoint of its geometry alone the relatively simple toroidal magnetic core having only a single flux path permits little improvement in switching speeds in this direction. However, in memory arrays exploiting the advantages of multi-apertured magnetic memory elements, such as is described, for example, in the copending application of J. L. Rogers, Serial No. 675,388, filed July 31, 1957, now Patent No. 2,926,342, a switching flux may frequently of necessity be caused to traverse paths of somewhat greater length than is the case in more simple magnetic memory structures. The greater distance to be traversed by a switching flux manifestly adds to the time required to complete a flux switching operation. The achievement of higher access speeds is thus also directly related to the simplicity of the memory element geometry and the lengths of the paths traversed by a switching flux.

Any simplification in the geometry of a multi-apertured memory element may thus achieve shorter flux switching paths with an attendant decrease in access time for a given current drive. In addition, a simplification in structural geometry also results in important economies in fabrication time and material utilized. Thus, in a multi-apertured magnetic memory element of the character contemplated in connection with the present invention a general consideration is the substantially uniform minimum cross-sectional areas of the element comprising controlled portions of a plurality of flux paths. The principles of such operation are described, for example, in the copending application of T. H. Crowley and U. F. Gianola, Serial No. 732,549, filed May 2, 1958, now Patent No. 2,963,591. Clearly any reduction in the number of legs of a multi-apertured element which must be held within a set dimension contributes to the foregoing savings in fabrication time and cost.

It is an object of the present invention to increase the switching speed and hence decrease the access time of coincident current magnetic memory arrays.

Another object of this invention is to provide a magnetic memory array employing multi-apertured memory elements as basic information storage cells having the advantage of both higher access speeds and simplicity of structure than has been hitherto possible.

Yet another object of this invention is to provide a memory array operated on coincident current techniques in which the magnitudes of the coincident energizing currents together have no upper limits.

A still further object of this invention is to provide a new and novel magnetic memory array.

The foregoing and other objects of this invention are realized in one specific illustrative embodiment thereof comprising a memory element fabricated of a magnetic material exhibiting substantially rectangular hysteresis characteristics to present a double apertured structure. Three flux legs are thus formed in the element which legs are connected at either end by bridging side rails. A first pair of energizing conductors, which may be termed the X and Y write conductors, thread a first aperture of the element and a second pair of conductors, which may be termed the X read conductor and the Y sensing conductor, thread a second aperture of the element. The two outermost legs of the memory element which are formed by the pair of apertures define a first closed flux loop and the single intermediate leg so formed presents a flux path which may be completed through either of the outer legs. From the foregoing association of energizing conductors, it is apparent that both of the X and Y write conductors are linked to flux loops closed through the first outer leg and either the intermediate or second outer leg. Similarly the X read conductor and Y sensing conductor are linked to flux loops closed through the second outer leg and either the intermediate or first outer leg. Advantageously, this interrelationship of energizing conductors and flux loops makes possible the new and novel operation of the present invention.

Although flux changes are brought about in each of the flux legs of the memory element during various stages in the operation of this invention, it is only the effect of those changes on the magnetic state of one of the legs which is controlling in the writing and reading operations. The latter leg is designated the information leg and is fully magnetically saturated or "set" for the storage of a binary "0." The saturation flux for the foregoing state may be closed through either of the remaining legs. A binary "1" magnetic state is manifested by the unmagnetized condition of the same information leg. In the latter case, a remanent flux may be closed in either direction through the remaining legs. During read out of a binary "0" a read current pulse applied via the X read conductor to the memory element tend to drive the flux in the information leg in the "set" direction. As a result and in accordance with conventional practice, no significant flux switching will occur in the "0" bearing information leg since it is already saturated in this direction. As a further consequence, no appreciable output signal is induced in the Y sensing conductor coupled to the flux loop including the information leg. On the other hand, should the information leg contain a binary "1," it will be magnetically driven to full magnetic saturation in the "set" direction. An output signal is now induced in the Y sensing conductor as a result of the flux change occurring in the coupled flux loop. Clearly, this is also in accord with conventional memory read-out practice. The memory element is thus left in a "set" magnetic condition which condition is also the cleared magnetic state of a memory element according to this invention.

A word-organized magnetic memory may be realized in accordance with this invention by arranging a plurality of memory elements as above described in a coordinate array. The rows and columns may be defined by the energizing conductors of the elements which then become the X coordinate write and read conductors and the Y coordinate write and sensing conductors, respectively. Access to the array for writing purposes is had by the coincident application of X and Y coordinate write current pulses. However, contrary to conventional practice, the coincidence of write currents at selected information addresses of a word row results in the writing of binary "0's" rather than binary "1's." Since the cleared state of an information leg is the fully saturated or "set" magnetic state, a coincidence of write currents acts to retain the cleared state in an information leg of a selected memory element. The cleared magnetic state, which conventionally corresponds to that representing a binary "0," is advantageously caused to remain in a selected memory element by maintaining a relationship between the coordinate drives such that the Y drive is held equal to or greater than the X drive.

The nonselected memory elements of a word row, that is, those elements having an X coordinate write current pulse alone applied thereto, will be switched from the cleared "set" state to a magnetic state in which the information legs are left substantially unmagnetized. These elements will accordingly contain the binary "1's" of the word row under consideration. During the write operation with respect to a selected row, other word rows will also have applied thereto the Y coordinate drives being applied to the selected row. In the conventional coincident current memory such drives each are only a part of the drive necessary to cause a complete flux switching in the memory element. However, in the conventional case, such partial drives are still generally sufficient to cause an appreciable excursion of the flux, the presence and the polarity of which bears the information significance. The cumulative effect of partial applied drives may, over a period, accordingly cause a substantial shift in the remanent magnetizations representing the stored information in a memory element.

In the present invention where advantageously no upper limit need be held for the coordinate coincident drive currents, the partial drives applied to nonselected memory elements of the word rows are directed to the flux loops of the elements not including the information legs. As a result, the magnetic states of the latter legs and hence the binary values so stored are left substantially undisturbed. As will appear hereinafter, whatever flux switching does occur in other portions of the memory element will have no effect on the subsequent operation of the memory. In conventional coincident current arrangements, the partial, critically limited drive currents are also extremely sensitive to changes in the properties of the magnetic material of which the memory element is fabricated. Such changes in properties are frequently caused by temperature changes during the operation of the circuit. This problem is also advantageously obviated in a memory element according to this invention since the coincident drive currents may be raised in magnitude beyond the point at which s:ch changes have effect. A magnetic memory is thus presented by this invention which may be simply fabricated, avoids the current limitations of conventional coincident current memory arrangements, and which achieves switching speeds hitherto attainable only by more complex structures.

After a read-out operation of the arrangement generally described in the foregoing an interrogated word row of memory elements is left in a cleared state. Thus, all of the information stored in a word row is destroyed in the act of determining its character. In accordance with another aspect of this invention, the memory element may be interrogated nondestructively. An additional, relatively smaller read-out aperture is provided in the information leg of the element to define therearound a secondary closed flux loop. Both the X coordinate read conductor and the Y coordinate sensing conductor of an information address are threaded through the read-out aperture. Read drives of alternating polarity applied to a selected word row then cause or fail to cause flux switching about the read-out apertures depending upon the overriding magnetic state of the information legs. In neither cases will the latter magnetic state be permanently altered by the nondestructive read drives.

Particularly, the features of the present invention include a two-apertured magnetic memory element adapted for arrangement in coordinate arrays in which the X and Y coordinate write conductors link the flux loops including the legs of the element defined by the first aperture. The X and Y coordinate read-out conductors then link the flux loops including the legs of the element defined by the second aperture.

Another feature of this invention is a coordinate wiring arrangement of a magnetic memory array providing the advantages of coincident current selection without limiting the coordinate energizing currents providing the coincident drives. By maintaining a relationship between the magnitudes of the coincident drive currents such that the Y drive current is always at least equal to or greater than the X drive current, coincident selection of information addresses in which the magnetic state is to be left in the "set" or cleared state is achieved. Information in a word row is thus changed by the selective application of row coordinate drive currents alone.

The objects and features of the present invention so far described may be better understood from a consideration of the detailed description of illustrative embodiments thereof which follows when taken in conjunction with the accompanying drawing in which:

FIGS. 1, 2, and 3 depict an illustrative memory element according to this invention and show representative magnetic flux conditions obtaining at various operative states;

FIG. 5 depicts another illustrative memory element according to this invention providing for nondestructive read out; and FIGS. 6 and 7 are fragmentary views of the memory element of FIG. 5 showing representative flux distributions at various operative stages.

Figure 1:
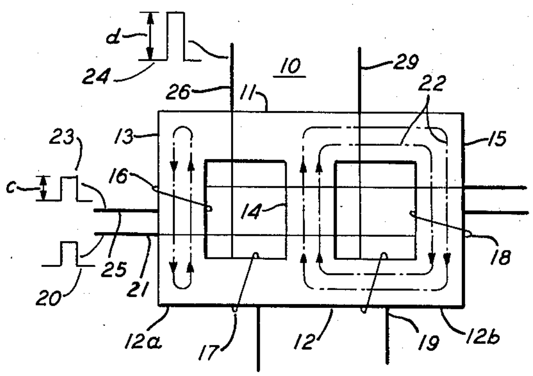

Referring to the drawing and particularly to FIG. 1 thereof, the organization and operation of a specific illustrative memory element according to the present invention may now be described in detail. A single bit storage circuit comprises an element 10 having a pair of side rails 11 and 12 which in turn have transversely disposed therebetween three flux legs 13, 14, and 15. Two apertures are thus formed in the element 10 which may for convenience be of substantially equal dimensions. The element 10 is fabricated of any wellknown magnetic material displaying substantially rectangular hysteresis characteristics. Due to the advantages offered by the present invention, at no point in its operation are the absolute switching characteristics of the selected magnetic material critical. Although any known ferrite material may be utilized for this purpose, it was found that a material having a relatively small switching constant and a large squareness ratio proved suitable. The relative dimensions of the element 10 may also be held to relatively wide tolerances. As will appear hereinafter, the leg 15 ultimately comprises the portion of the element 10 in which significant flux switching is to occur. Accordingly, it is necessary to insure during operation only that the leg 15, or information leg, be fully magnetically saturated. As a result, if any minor variations in the dimensions of the legs do occur, the information leg 15 is held at most equal to or smaller than the minimum cross-sectional areas of the legs 13 and 14. The minimum cross-sectional areas of the latter legs are maintained substantially equal. The minimum cross-sectional areas of the side rails 11 and 12 are maintained equal to or larger than that of the largest cross-sectional areas of the legs 13 and 14 to provide adequate return paths for flux induced in the latter legs and the leg 15 during switching operations.

An illustrative memory element, such as the element 10, has inductively coupled to the possible flux loops defined by the legs, a plurality of energizing windings. The flux loop defined by the legs 13 and 14 and the side rails 11 and 12 has coupled thereto an X write winding 16 and a Y write winding 17. The windings 16 and 17 are conveniently wound on the leg 13 and a portion **12*a* of the side rail 12, respectively. The flux loop defined by the leg 14, the information leg 15, and the side rails 11 and 12 has coupled thereto an X read winding 18 and a Y sensing winding 19. The windings 18 and 19 are conveniently wound on the leg 15 and a portion 12*b* of the side rail 12, respectively. Although multi-turn windings are shown to illustrate their inductive coupling to the cited portions of the element 10 in FIG. 1, it is to be understood that single turn windings may be used to simplify the wiring assembly as is the case in other embodiments of this invention to be described hereinafter. The illustrative memory element 10** is shown isolated from any circuit or system of which it may comprise a basic storage cell; accordingly, no current sources or other circuit elements are included in the simplified showing of FIG. 1. For purposes of describing the operation of the basic element of FIG. 1, it will be assumed that the necessary circuits are closed and suitable current sources are provided. Such a complete arrangement will be described in greater detail hereinafter with respect to a coordinate array of elements according to this invention.

To prepare the element 10 for a storage operation and to clear it of information previously stored therein, a read current pulse 20 is applied to the X read winding 18 via a conductor 21. The current pulse 20 is positive in view of the sense of the winding 18 and the polarity of the magnetomotive force to be generated. The magnitude of the pulse 20 has no upper limit and should be sufficient to drive the information leg to complete magnetic saturation. As a result of the applied read pulse 20, the information leg 15 is set, that is; driven to a remanent magnetic flux condition as represented in FIG. 1 by the broken lines 22. Although the latter flux is shown as being closed through the leg 14 with the leg 13 being left magnetically neutral, such as a flux distribution need not necessarily result. Thus, the flux induced in the leg 15 may as well be closed partially or wholly through the leg 13 without affecting the operation of this invention. The latter condition may actually occur as a result of operations to be described in connection with a coordinate array of the memory elements 10 hereinafter. The memory element of FIG. 1 is now set or, in accordance with the mode of operation of the present invention, is in a cleared magnetic state and an information bit may now be introduced.

In accordance with conventional practice one of the binary information values which may be stored in the element 10 is represented by a remanent magnetic state which corresponds to the magnetic state of the element in its cleared state. This value is generally established as a binary "0" and this convention is also followed in the present invention. However, in the present invention the binary "0" and cleared state are represented by a set magnetic state while the binary "1" value is represented by an unmagnetized state of the information leg 15 of an element 10. To write a binary "0" it is accordingly necessary to retain the cleared magnetic state in the element 10. To accomplish this, a write current pulse 23 and a write current pulse 24 are coincidentally applied to the X and Y write windings 16 and 17 via the conductors 25 and 26, respectively. The relative magnitudes *c* and *d* of the respective write current pulses 23 and 24 are such that *d* is equal to or greater than *c*. To insure adequate operation the magnitude *d* of the current pulse 24 is conveniently made larger than the magnitude *c* of the current pulse 23. The magnetomotive force generated in the winding 16 by the pulse 23 is in a direction to remanently saturate the leg 13 downward as viewed in the drawing. Flux closure in this case would be through the closest return path in accordance with known magnetic principles. This path would be through the leg 14 and, as a result in such a case, the information leg 15 would be left substantially unmagnetized.

Figure 2:
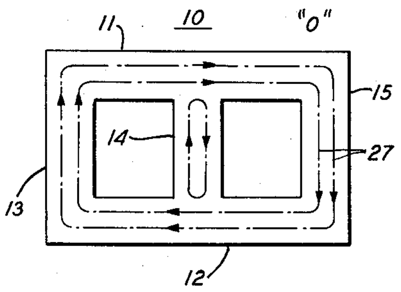

The larger magnetomotive force generated by the pulse 24 in the winding 17, however, acts in the opposite direction and is the dominant force acting during the coincident write operation. As a result, the side rail 12 will be remanently saturated in the left-hand direction and the leg 13 will be remanently saturated upward, both as viewed in the drawing. The magnetomotive force acting on the information leg 15 is in the direction in which the leg 15 is already remanently saturated. Accordingly, no significant flux change takes place in the latter leg. Since no flux closure paths are available for the flux initially shown as saturating the intermediate leg 14, the latter leg is left in a substantially unmagnetized state as the result of the foregoing coincident current write operation. The flux distribution as a result of one write operation and a distribution representative of a stored binary "0," is shown in FIG. 2, the flux closures being represented by the broken lines 27.

Figure 3:
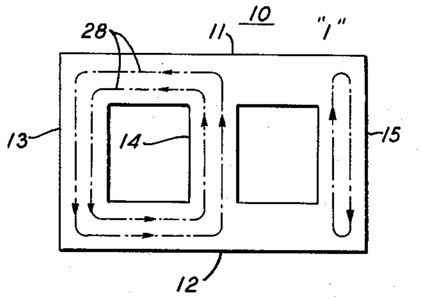
Figure 3:
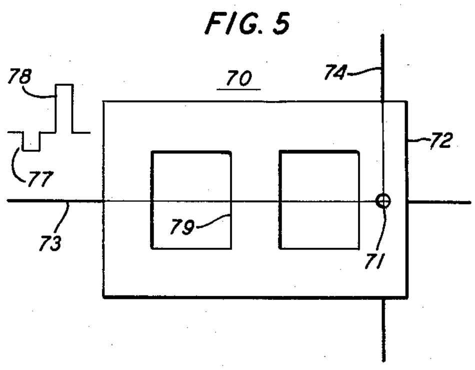
Figure 3:
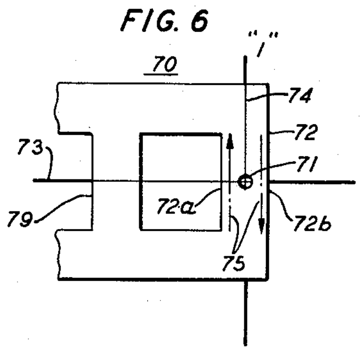
Figure 3:
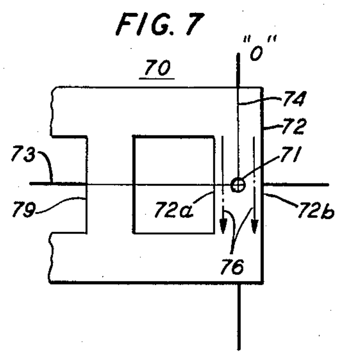

A binary "1" is written into the element 10 by causing a partial reversal of the flux in the information leg 15. To accomplish this reversal, only the X write current pulse 23 is applied to the conductor 25 and thereby the X write winding 16. Since in this write operation no counteracting magnetomotive force is being applied, the leg 13 is driven into magnetic saturation in the downward direction as viewed in FIG. 1. In accordance with known magnetic principles, the flux so induced in the leg 13 will be closed through the shortest available path. The latter path is now presented by the leg 14 which is already remanently saturated in the upward direction as viewed in the drawing. The flux in the leg 14 accordingly links with the flux being induced in the leg 13 leaving the information leg 15 now substantially unmagnetized. The flux in the leg 15 has, as a result, undergone a partial reversal from one point of remanent magnetization to a point of substantially zero magnetization. The flux distribution as a result of the foregoing write operation and a distribution representative of a stored binary "1," is shown in FIG. 3, the flux closures being represented by the broken lines 28.

The two binary values "1" and "0" are thus stored in the element 10 by a substantially unmagnetized state of the information leg 15 and a state in which the leg 15 is remanently saturated in either direction, respectively. Which direction the leg 15 is to be saturated to represent a binary "0" is obviously interrelated with the sense of the energizing windings and the polarity of the energizing currents available. The particular directions of flux closures in view of the polarity of the current pulses and winding directions shown in the drawing have been selected only for purposes of description. It is also clear that the representative magnetic states above described may be reversed in their assignment of the two binary values without in any manner affecting the novel operation of this invention.

Read out of an information bit stored in the element 10 may be accomplished by means of the read current pulse 20 applied to the conductor 21 as previously explained. If a binary "0" is stored, the magnetomotive force generated in the read winding 18 by the read current pulse 20 is of a direction so as to leave the saturated state of the information leg 15 undisturbed. Only a negligible flux excursion will be caused to take place to induce only a negligible output signal in the Y sensing winding 19. The failure of an appreciable output signal on the conductor 29 connected to the latter winding will thus be indicative of the fact that a binary "0" was stored in the element 10. On the other hand, if a binary "1" is stored in the element 10, the effect of the applied read current pulse 20 is to drive the information leg 15 from a condition of substantially zero magnetization to full saturation in the direction shown in the drawing and assumed for purposes of description. The flux switching thus occurring induces an output signal in the sensing winding 19 of a substantially greater magnitude than that of the negligible signal induced for the read out of a binary "0." The large output signal will thus be available on the conductor 29 as indicative of the fact that a binary "1" was stored in the magnetic element 10. The output signals representative of the two binary values are thus in accord with conventional practice.

Figure 4:
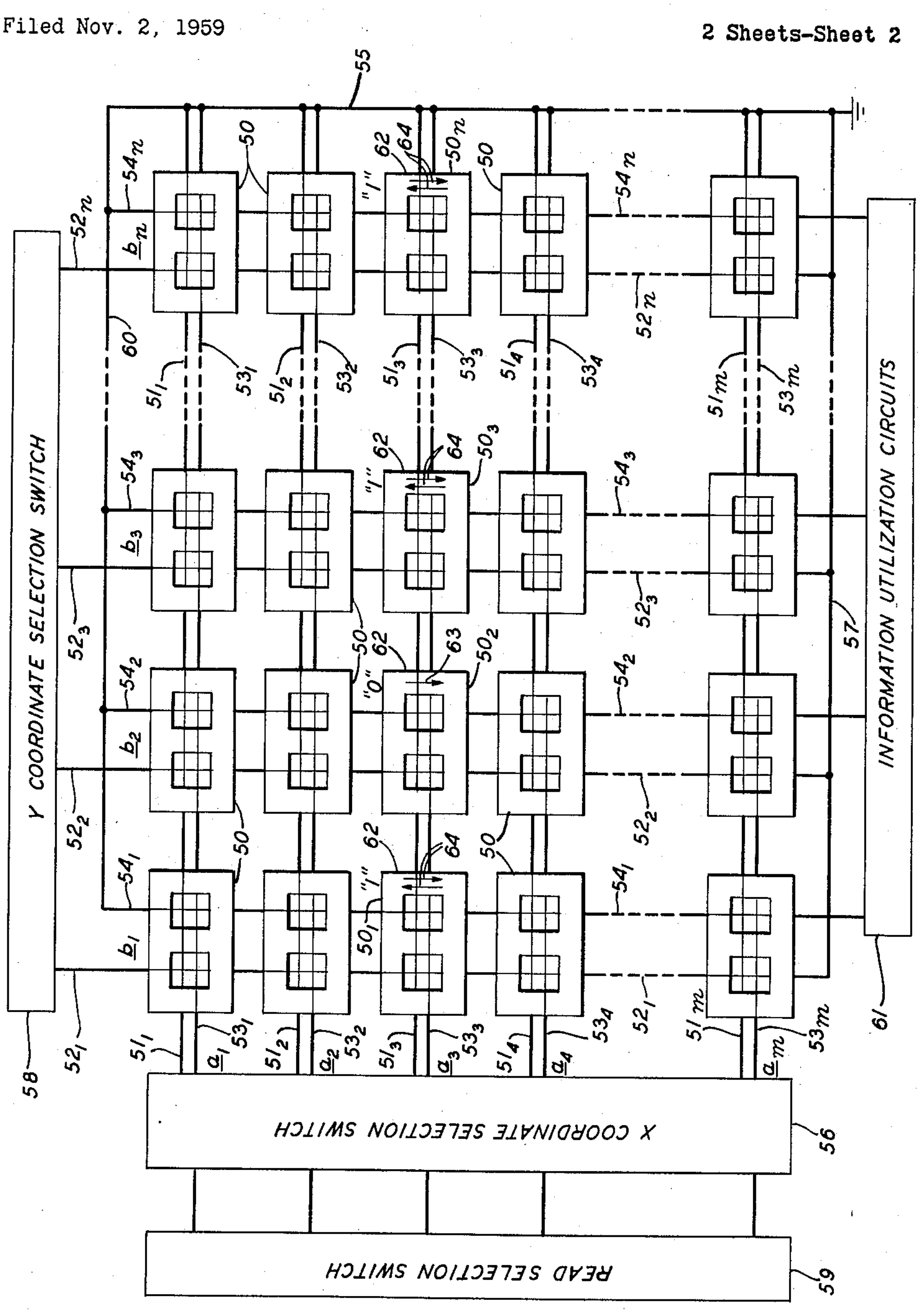
FIG. 4 shows an illustrative coordinate memory array employing memory elements according to this invention as the basic storage elements.

The element 10 of FIG. 1 is advantageously adaptable as a basic storage cell of a coordinate array magnetic memory. One specific illustrative memory arrangement incorporating a plurality of coordinately associated elements according to this invention is depicted in FIG. 4. The memory elements, designated 50 in FIG. 4, are arranged in rows $a_1, a_2, a_3, a_4, \ldots$ and $a_m$ and in columns $b_1, b_2, b_3, \ldots$ and $b_n$. The first aperture of each of the elements 50 formed by the first two legs is threaded by an X coordinate write conductor 51 and a Y coordinate write conductor 52. The second aperture of each of the elements 50 formed by the intermediate leg and the information leg is threaded by an X coordinate read conductor 53 and a Y coordinate sensing conductor 54. Each of the conductors 51 is connected at one end to a ground bus 55 and at its other end to an X coordinate selection switch 56. Each of the conductors 52 is connected at one end to a ground bus 57 and at its other end to a Y coordinate selection switch 58. Each of the conductors 53 is also connected at one end to the ground bus 55 and at its other end to a read selection switch 59. The Y coordinate sensing conductors 54 are each connected at one end to a ground bus 60 and at the other end to information utilization circuits 61. The X and Y coordinate selection switches 56 and 58, respectively, may comprise any suitable circuitry capable of selectively providing current pulses of a polarity to be described hereinafter. The selective control of the switches 56 and 58 and their coincident operation may be achieved by control pulses obtained from and timed by associated circuitry of the system with which the memory of FIG. 4 is adapted for use. Since circuits of the character contemplated as comprising the switches 56 and 58 are well-known in the art a detailed description thereof need not be provided here. The read selection switch 59 may similarly comprise any suitable circuit capable of providing current pulses of the polarity and at the times to be described hereinafter. Such sources of drive current pulses are also readily devisable by one skilled in the art and would also be controllable by control pulses from a parent system. Circuits such as the information utilization circuits 61 may also comprise well-known circuits capable of accepting and handling binary information in the form of output signals of different magnitudes.

In the foregoing organization of the X and Y sets of coordinate conductors, each of the sets of conductors in threading an aperture of a particlar magnetic structure 50 defines an information address. Access to any information address or row of information addresses is obtained by the coincident energization of the X and Y coordinate conductors defining the particular address or addresses. The memory array of FIG. 4 is assumed to be word organized, that is, each of the rows $a_1$ through $a_m$ are organized to store an information word each containing $n$ bits. The corresponding memory elements 50 of the rows then contain corresponding information bits of the words stored. For purposes of describing an illustrative operation of the memory array of FIG. 4, it will be assumed that a binary word containing the bits 1, 0, 1, . . . 1 is to be stored in and read from the word row $a_3$. Prior to the present write operation each of the elements 50 of the row $a_3$ has been cleared, that is, the information leg 62 of each of these elements has been driven to a fully saturated state represented as downward in FIG. 4 of the drawing by the arrow 63, for example. Accordingly, in order to establish the representative magnetic states in the elements 50 of the word row $a_3$, only the present states of the elements $\mathbf{50}_1$, $\mathbf{50}_3$, and $\mathbf{50}_n$ need be altered. This is accomplished in the present embodiment by applying from the switches 56 and 58, coincident current pulses of the relative magnitudes previously described in connection with the single element 10 of FIG. 1, to the X coordinate write conductor $\mathbf{51}_3$ and to the Y coordinate write conductor $\mathbf{52}_2$, respectively. As a result, the magnetic state of the information leg 62 of the element $\mathbf{50}_2$ is maintained in its set state. Each of the other elements $\mathbf{50}_1$, $\mathbf{50}_3$, and $\mathbf{50}_n$, however, has only the write current pulse from the switch 56 applied thereto. As a result, due to the flux action in each of the latter elements, also as previously described in connection with the embodiment of FIG. 1, the information legs 62 of these elements will be driven to substantially unmagnetized states which states are determined as being representative of binary "1's." This state for each of the elements containing this value has been indicated in FIG. 4 by the arrows 64. The information values for the illustrative word row being considered have thus been written into the memory and the word row $a_3$ is now prepared for a subsequent interrogation operation.

Before proceeding to a description of an illustrative read-out operation of the memory of FIG. 4, it is convenient at this point to consider the effect of the Y coordinate magnetomotive drives being applied to the memory elements 50 falling in the column $b_2$ and included in the unselected word rows $a_1$, $a_2$, $a_4$, and $a_m$. It may be noted that the latter elements 50 have applied thereto via the conductor $\mathbf{52}_2$, the Y coordinate write current pulse simultaneously with the coincident application of the X coordinate and Y coordinate write current pulses to the memory elements $\mathbf{50}_2$ of the selected word row $a_3$. The memory elements 50 of the unselected rows energized by the Y coordinate write current pulse will have either a binary "1" or a "0" stored therein or will be in a cleared magnetic state which will correspond effectively to the state representing a binary "0." In considering whatever effect the Y coordinate write current pulse applied alone will have on the information bearing state of a memory element 50, reference may again be had to FIGS. 1 through 3.

In FIG. 1 the element 10 is shown as being in a cleared magnetic state with the information leg 15 being magnetically saturated downward as viewed in the drawing. The latter saturated state of the information leg 15 accords with the state of the leg 15 when the element 10 contains a binary "0" with the exception that the flux closure of the saturation flux occurs through different legs. Thus, the coincident selection drives writing a binary "0" in a memory element 10 have the effect only of redistributing the flux in portions of the element 10 other than the information leg 15 which carries the significant flux state. This true binary "0" magnetic state is depicted by the broken lines 27 in FIG. 2. The redistribution of the flux on an element 10 in which the information leg 15 is left substantially unmagnetized as the result of a write "1" drive is depicted by the broken lines 28 in FIG. 3. It is accordingly the effect of Y coordinate write drive alone on the flux states shown in FIGS. 2 and 3 which must now be described.

Consider first the action of the Y coordinate write drive on the element 10 of FIG. 1, or similarly on an element 50 of FIG. 4, containing a binary "0." In this case, as is apparent from an examination of FIG. 2 and the flux distribution there depicted, a Y coordinate positive write current applied to the conductor 26 alone will merely drive the first leg 13 further into saturation. The flux closure and direction will remain unchanged and the information bearing magnetic state of the information leg 15 will be left undisturbed. It is thus clear that those of the elements 50 of the rows other than a selected row, and which elements 50 contan binary "0's," will remain uneffected by drive currents applied via the Y coordinate conductors alone. Such elements 50 as contain binary "1's," however, will undergo an inconsequential flux redistribution as the result of such Y coordinate currents alone. As may be determined from an inspection of FIGS. 1 and 3 and specifically noting the sense of the winding 17 and the polarity of the Y coordinate write drive current pulse 24 of the element 10, the effect of the latter pulse 24 applied alone is to switch completely the remanent flux closed through the legs 13 and 14. Since the shortest path for such an induced switching flux is through the latter legs, no significant change is caused in the unmagnetized state of the information leg 15. Due to the minor differences in cross-sectional areas of the legs 13, 14, and 15, should such differences exist, some spill-over of flux may occur through the leg 15. However, in such a case leg 15 will never be driven to saturation and will remain effectively unmagnetized. An element 10, or similarly an element 50 of FIG. 4, containing a binary "1," although suffering a minor flux change as a result of a Y coordinate write current applied alone, will remain unchanged in its significant information bearing magnetic state. Such Y coordinate write drive currents applied alone will manifestly be repeated in the elements 50 of a memory array according to FIG. 4 as the rows of the array are repeatedly selectively or sequentially written into and interrogated. Since the only magnetic disturbance resulting therefrom, that is, the one occurring in an element 50 containing a binary "0," is isolated from the information bearing leg 62, even repeated partial drives applied to an element 50 will fail to disturb a bit of stored information. As will appear hereinafter, such a magnetic redistribution as does occur will also fail to effect a subsequent read-out operation.

Such a read-out operation is initiated in a memory array according to this invention as depicted in FIG. 4 by applying a read current pulse from the switch 59 to the X coordinate read conductor of a word row to be interrogated. In the illustrative operation being described this conductor is the conductor $\mathbf{53}_3$ of the word row $a_3$. As was previously described in connection with the single element embodiment of FIG. 1, the read current pulse in this case is positive and the resultant magnetomotive drives developed thereby tend to drive the information legs 62 in a downward direction of magnetic saturation as viewed in the drawing. Any flux changes or switchings will be reflected in the currents induced thereby in the sensing conductors $54_1$ through $54_n$. Each of the latter conductors is linked to a flux loop of an element 50 including an information leg 62. Accordingly, since the leg 62 of the element $50_2$ of the interrogated word row is already saturated in the driven read direction only a negligible flux excursion will occur in that leg. The negligible signal so induced will be available on the sensing conductor $54_2$ and will be indicative of the presence in the element $50_2$ of a binary "0." The effect of the read current on the elements $50_1$, $50_3$, . . . and $50_n$ of the interrogated word row $a_3$, however, will be to drive the information legs 62 of the latter elements to complete saturation in the driven read direction. As a result, the resultant flux excursions will induce significant and appreciable output signals on the sensing conductors $54_1$, $54_3$, . . . and $54_n$. These signals will be indicative of the presence in the coupled elements 50 of binary "1's." As a result of the foregoing illustrative read-out operation, signals representative of the word containing the information bits 1, 0, 1, . . . 1 will be simultaneously transmitted to the information utilization circuits 61 via the sensing conductors $54_1$ through $54_n$. Since the interrogating read drive acts only on the flux loops including the information legs 62, it is clear that whatever flux disturbances occurred in flux loops including the remaining legs of the structures 50 by partial Y coordinate write drives, none will have any effect on the integrity of the output signals.

The read current applied to the X coordinate read conductor $53_3$ will also clear the interrogated word row $a_3$, which row will thus be in readiness for the introduction in a subsequent write operation of a new information word for the reintroduction of the word read out. Such writing operations may be controlled by external circuits in turn controlling the operation of the selection switches 56 and 58. However, such circuits do not comprise a part of the present invention and accordingly need not be further referred to herein. Access to the remaining word rows $a_1$, $a_2$, $a_4$ . . . and $a_m$ may be had for both writing and reading operations in a manner identical to that described in the foregoing for the illustrative word row $a_3$.

In the foregoing operation, it is clear that the read-out was destruction. An interrogated word row is also cleared of its stored information in the process of reading it. Nondestructive read out may be achieved by a simple modification of the element 10 of FIG. 1 or the elements 50 of FIG. 4. Such an illustrative modified element providing for nondestructive read out is depicted in FIG. 5. A magnetic element 70 identical in every other particular to that specifically described in connection with FIG. 1 above is provided with a small aperture 71 substantially centrally in its information leg 72. An X read conductor 73 threads the aperture 71 as does a Y sensing conductor 74. Writing into the structure 70 of an information value is accomplished in a manner identical to that described above in detail for the element 10 of FIG. 1. The flux distributions representative of the two binary values are represented respectively by the arrows 75 and 76 in the partial views of FIGS. 6 and 7. It is clear from the latter figures that the aperture 71 divides the information leg 72 of the element 70 into two sub-legs 72*a* and 72*b*. The unmagnetized state of the information leg 72 representative of a binary "1" may then be understood as the oppositely directed magnetization of the sub-legs 72*a* and 72*b* as symbolized by the arrows 75 in FIG. 6. The fully saturated magnetic state of the information leg 72 representative of a binary "0" may be understood as the similarly directed magnetizations of the sub-legs 72*a* and 72*b* as symbolized by the arrows 76 in FIG. 7.

Although the write operation with respect to the memory element 70 is identical to that earlier described herein, the read-out operation is performed by applying read drive currents of two polarities to the read conductor 73.

An initial negative current pulse 77 is applied to the X read conductor 73 followed by a positive current pulse 78. The pulse 77 is of a magnitude sufficient to cause a flux reversal about the aperture 71 but is so limited as to be unable to cause a flux reversal between the information leg 72 and the adjoining leg 79. Should the element 70 contain a binary "1," *a* flux reversal will be caused about the aperture 71 by the negative pulse 77 to induce an output signal in the sensing conductor 74. The immediately following positive current pulse 78 acts to restore the original magnetic condition of the leg 72 to make possible subsequent nondestructive interrogations of the element 70. Reference may be had to FIG. 6 and the flux directions there assumed to verify the foregoing action of the read drive current pulses on the magnetic state of the information leg 72. If a binary "0" is stored in an interrogated element 70, the initial negative pulse 77 will be unable to cause a flux reversal about the aperture 71 since both sub-legs 72*a* and 72*b* of the leg 72 are magnetically saturated in the same direction. No closure path for a switching flux in the sub-leg 72*b* is thus available except through the adjoining leg 79. Since the read current pulse 77 is specifically limited to preclude the latter closure of flux, no appreciable flux change occurs in the information leg 72 as a result. The immediately following positive current pulse 78 is also ineffective to cause a flux reversal in the sub-leg 72*b* of the leg 72. Although not limited in magnitude, the read pulse 78 causes no flux switching since the magnetomotive force generated thereby merely drives the sub-leg 72*b* in the direction in which it is already saturated. The action of the applied read current pulse 77 and 78 on an element 70 containing a binary "0" as described in the foregoing may also be demonstrated with reference to FIG. 7. Since no flux switching occurs in the information leg 72 as a result of the reading of a stored "0," the absence of an induced output signal on the sensing conductor 74 is indicative of the presence in the interrogated element 70 of that information value.

In the foregoing description of embodiments of this invention various flux closures and behavior have been assumed during various operative stages. These have been postulated only as one theory of operation and the actual internal flux behavior in the magnetic elements described may be considerably more complex. However, in view of the substantially similar flux limitations of the various magnetic flux paths, the explanation provided is adequate for a complete teaching of the principles of this invention and the manner of its practice.

What have been described are considered to be illustrative embodiments of the present invention. Accordingly, it is to be understood that various and numerous other arrangemenss may be devised by one skilled in the art without departing from the spirit and scope of this invention.

What is claimed is:

1. A memory circuit comprising a magnetic element of a material having substantially rectangular hysteresis characteristics, said element having a first and a second aperture therein defining an adjacent first, second, and third flux leg, each of said flux legs and the connecting portions of said element having substantially the same minimum cross-sectional areas, means for applying a switching magnetomotive force to said third flux leg to induce a remanent flux in one direction in said third flux leg, a first write winding inductively coupled in one sense to only a first flux loop defined in said element by said first aperture and including said first and said second flux leg, a second write winding also inductively coupled to only said first flux loop in the opposite sense, means for substantially demagnetizing said third flux leg representative of one information value comprising means for applying a first current pulse to said first write winding to induce a remnant flux in said one direction in said first flux leg, and means for retaining said remanent flux in said one direction in said third flux leg representative of another information value comprising means for applying a second current pulse to said second write winding substantially coincidentally with said first current pulse to induce a remanent flux in the opposite direction in said first flux leg.

2. A memory circuit according to claim 1 also comprising read-out means comprising means for again applying said switching magnetomotive force to said third flux leg and a sensing winding inductively coupled to a second flux loop defined in said element by said second aperture and including said second and third flux legs.

3. A memory circuit comprising a magnetic element having substantially rectangular hysteresis characteristics, said element having only a first and a second aperture therein to define an adjacent first, second, and third flux leg, each of said flux legs and the connecting portions of said element having substantially the same minimum cross-sectional areas, said third flux leg having a remanent flux in one direction therein, a first write winding threading said first aperture in one sense and inductively coupled only to a magnetic circuit in said element defined by said first aperture, a second write winding threading said first aperture in the opposite sense and also inductively coupled only to said magnetic circuit in said element defined by said first aperture, means for rendering said third flux leg substantially unmagnetized representative of one information value comprising means for applying a first write current pulse to said first write winding to induce a remanent flux in said first flux leg in said one direction, means for retaining said remanent flux in one direction in said third flux leg representative of another information value comprising means for applying a second write current pulse of a magnitude greater than said first write current pulse to said second write winding substantially simultaneously with said first write current pulse to induce a remanent flux in said first flux leg in a direction opposite to said one direction.

4. A memory circuit according to claim 3 also comprising a read winding threading said second aperture, means for applying a read current pulse to said read winding to induce a remanent flux in said third flux leg when said last-mentioned leg is substantially unmagnetized, and a sensing winding threading said second aperture energized responsive to flux changes in said third flux leg for generating output signals indicative of said information values.

5. A memory circuit comprising a magnetic element having substantially rectangular hysteresis characteristics, said element having only two apertures therein, a first and a second write winding threading a first of said apertures, a read winding threading a second of said apertures, means for initially inducing a remanent magnetization about said second aperture in one direction, means for applying a first write current pulse to said first write winding to induce a remanent magnetization about said first aperture in the opposite direction and erase said remanent magnetization about said second aperture representative of one information value, means for applying a second write current pulse to said second write winding substantially simultaneously with said first write current pulse to induce a remanent magnetization about said first and said second apertures in said one direction representative of another information value, means for applying a read current pulse to said read winding to again induce a remanent magnetization about said second aperture in said one direction, and a sensing winding threading said second aperture energized responsive to flux changes about said second aperture for generating output signals indicative of said information values.

6. A memory circuit comprising a plurality of magnetic elements each being of a material having substantially rectangular hysteresis characteristics, each of said elements having a first and a second aperture therein to present a first, a second, and a third flux leg, each of said flux legs and the connecting portions of said elements having substantially the same minimum cross-sectional areas, a set winding individual to and threading the first aperture of each of said elements, said set winding being coupled to a first of said flux legs, a first and a second write winding individual to and threading the second aperture of each of said elements in opposite senses, said write windings both being coupled only to a second of said flux legs, first circuit means for connecting each of said set winding in series, second circuit means for connecting each of said first write windings in series, means for initially applying a set current pulse to said first circuit means to induce a remanent flux in one direction in the first flux leg of each of said elements, means for subsequently applying a first write current pulse to said second circuit means to induce a remanent flux in said one direction in the said second flux leg of said elements and erase said remanent flux in said first flux legs representative of one information value, and means for applying second write current pulses each of a magnitude greater than said first write current pulse to selected ones of said second write windings substantially coincidentally with said first write current pulse to retain said remanent flux in said first flux legs of particular ones of said element representative of other information values.

7. A memory circuit according to claim 6 also comprising means for again applying said set current to said first circuit means to reinduce a remanent flux in said one direction in the first flux leg of each of said elements and a sensing winding individual to and threading the first aperture of each of said elements energized responsive to flux changes in said first flux legs to generate output signals indicative of said one information value.

8. A memory circuit comprising a plurality of magnetic elements each being of a material having substantially rectangular hysteresis characteristics, each of said elements having a first and a second aperture therein to present a first, a second, and a third flux leg, each of said flux legs and the connecting portions of said elements having substantially the same minimum cross-sectional areas, said elements being arranged in rows and columns, a set winding individual to and threading the first aperture of each of said elements, a first and a second write winding individual to and threading the second aperture of each of said elements and inductively coupled to a flux path including only said second and third flux legs in opposite senses, a plurality of first circuit means for connecting each of said set windings of said rows of elements in series, a plurality of second circuit means for connecting each of said first write windings of said rows of elements in series, a plurality of third circuit means for connecting each of said second write windings of said columns of elements in series, means for initially applying a set current pulse to a selected one of said plurality of first circuit means to induce a remanent flux in the first flux leg of each element of a selected row of elements, means for subsequently applying a first write current pulse to said selected one of said first circuit means to induce a remanent flux in the third flux leg of each element of said selected row of elements representative of one information value, and means for applying second write current pulses each of a magnitude greater than said first write current pulse to selected ones of said plurality of third circuit means substantially coincidentally with said first write current pulse to retain said remanent flux in said first flux legs of particular elements of said selected row of elements representative of other information values.

9. A memory circuit according to claim 8 also comprising means for again applying said set current pulse to said selected one of said first circuit means to reinduce a remanent flux in the first legs of each element of said selected row of elements, a sensing winding individual to and threading said first aperture of each of said elements, and a plurality of fourth circuit means for connecting each of said sensing windings of said columns of elements in series, said plurality of fourth circuit means having output signals induced therein responsive to flux changes in said first flux legs indicative of said one information value.

10. In a word organized memory circuit, a plurality of magnetic elements arranged in an XY coordinate array, each element being capable of assuming stable remanent flux states, each of said elements having a first and a second aperture therein, an X coordinate write conductor threading the first aperture of each of the elements of an X coordinate of elements and defining an information word address, a Y coordinate write conductor threading the first aperture of each of the elements of a Y coordinate of elements and defining an information bit address in said information word, an X coordinate read conductor threading the second aperture of each of the elements of said X coordinate of elements, means for initially applying a read current pulse to said X coordinate read conductor to induce a clear remanent flux state in the flux leg defined only by said second aperture of each of said elements of said information row, means for subsequently applying a first write current pulse to said X coordinate write conductor to erase said remanent flux states from said last-mentioned flux legs representative of first information values, means for applying to said Y coordinate write conductor a second write current pulse overriding said first write current pulse for retaining said remanent flux state in the last-mentioned flux leg of said information-bit address representative of a second information value, and a Y coordinate sensing conductor threading the second aperture of each of the elements of said Y coordinate of elements having output signals induced thereon responsive to flux changes in said last-mentioned flux leg indicative of said information values in said information bit address.

11. A memory circuit comprising a magnetic element having substantially rectangular hysteresis characteristics, said element having three flux legs of substantially equal minimum cross-sectional areas defined by two apertures therein, an X and a Y write winding threading a first of said apertures in opposite senses, a read winding threading the second of said apertures, means for initially establishing a remanent flux in an information flux leg defined by said second of said apertures, means for applying a first current pulse to said X write conductor to transfer said remanent flux from said information flux leg to an input flux leg defined by said first of said apertures representative of one information value, means for applying an overriding second current pulse to said Y write conductor substantially coincidentally with said first current pulse to prevent said transfer of said remanent flux from said information leg representative of another information value, means for subsequently applying a read current pulse to said read winding to apply a magnetomotive force to said information leg in the direction of said remanent flux, and a sensing winding threading said second of said apertures energized responsive to flux switching in said information leg for generating output signals indicative of said one information value.

12. A memory circuit comprising a magnetic element having substantially rectangular hysteresis characteristics, said element having two apertures therein so spaced as to define three flux legs of substantially equal minimum cross-sectional areas arranged in series, means for initially establishing a remanent flux in a first end flux leg, means including an X write conductor threading the aperture defining a second end flux leg for transferring said remanent flux from said first end flux leg to said second end flux leg representative of one information value, means including a Y write conductor also threading said last-mentioned aperture for inducing a remanent flux in said second end flux leg linking with said remanent flux in said first end flux leg representative of another information value, means including an X read conductor threading the aperture defining said first end flux leg for applying a magnetomotive force to said first end flux leg in the direction of said remanent flux, and means including a Y sensing conductor also threading said last-mentioned aperture for detecting flux changes in said first end flux leg.

13. A memory circuit comprising a magnetic element having substantially rectangular hysteresis characteristics, said element having two apertures therein so spaced as to define three flux legs of substantially equal minimum cross-sectional areas arranged in series, a first end flux leg having a third aperture therein, means for initially establishing a remanent flux in said first end flux leg, means including an X write conductor threading the aperture defining a second end flux leg for transferring said remanent flux from said first end flux leg to said second end flux leg representative of one information value, means including a Y write conductor also threading said last-mentioned aperture for inducing a remanent flux in said second end flux leg linking with said remanent flux in said first end flux leg representative of another information value, means including an X read conductor threading said third aperture for causing a flux switching about said last-mentioned aperture when said first end flux leg is in a demagnetized state, and means including a Y sensing conductor also threading said third aperture energized responsive to said flux switching for generating an output signal indicative of said one information value.

14. In a magnetic memory array, a first and a second plurality of magnetic elements, each element of said first and second plurality of magnetic elements having substantially rectangular hysteresis characteristics and having two apertures therein so spaced as to define three flux legs of substantially equal minimum cross-sectional areas arranged in series, means for initially establishing a remanent flux in a first end flux leg of each element of said first and said second plurality of elements, means including an X write conductor threading the apertures defining second end flux legs of said first plurality of elements for transferring said remanent flux from said first end flux legs to said second end flux legs representative of first information values, means including a Y write conductor threading the apertures defining second end flux legs of said second plurality of elements and of a selected element of said first plurality of elements for inducing a remanent flux in said last-mentioned second end flux legs, said last-mentioned remanent flux linking with the remanent flux in the first end flux leg of said selected element representative of another information value, means including an X read conductor threading the apertures defining said first end flux legs of said first plurality of elements for applying a magnetomotive force to said first end flux legs in the direction of said remanent flux, and means including a Y sensing conductor threading the apertures defining said second end flux legs of said second plurality of elements and of said selected element for detecting flux changes in said first end flux leg of said last-mentioned element.

15. In an XY coordinate memory array, a first and a second plurality of magnetic elements arranged in an X and a Y coordinate, respectively, each element of said first and said second plurality of elements having substantially rectangular hysteresis characteristics and having two apertures therein so spaced as to define three flux legs of substantially equal minimum cross-sectional areas arranged in series, a first end flux leg of each of said elements having a third aperture therein, means for initially establishing a remanent flux in said first end flux leg of each element of said first and said second plurality of elements, means including an X write conductor threading the apertures defining second end flux legs of said first plurality of elements for transferring said remanent flux from said first end flux legs to said second end flux legs representative of first information values, means including a Y write conductor threading the apertures defining second end flux legs of said second plurality of elements and of a selected element of said first plurality of elements for inducing a remanent flux in said last-mentioned second end flux legs, said last-mentioned remanent flux linking with the remanent flux in the first end flux leg of said selected element representative of another information value, means including an X read conductor threading said third aperture of said first plurality of elements for causing a flux switching about the third aperture of said first leg of said selected element when said last-mentioned leg is in a demagnetized state, and means including a Y sensing conductor threading the third apertures of said second plurality of elements energized responsive to said last-mentioned flux switching for generating an output signal indicative of said one information value.

References Cited in the file of this patent

UNITED STATES PATENTS

| | | |
|---|---|---|
| 2,869,112 | Hunter | June 13, 1959 |
| 2,884,622 | Rajchman | Apr. 28, 1959 |
| 2,902,676 | Brown | Sept. 1, 1959 |
| 2,911,631 | Warren | Nov. 3, 1959 |